Oct. 15, 1946.　　　M. H. ARVESON　　　2,409,234
REVIVIFYING ADSORPTIVE MATERIAL
Filed Dec. 31, 1940
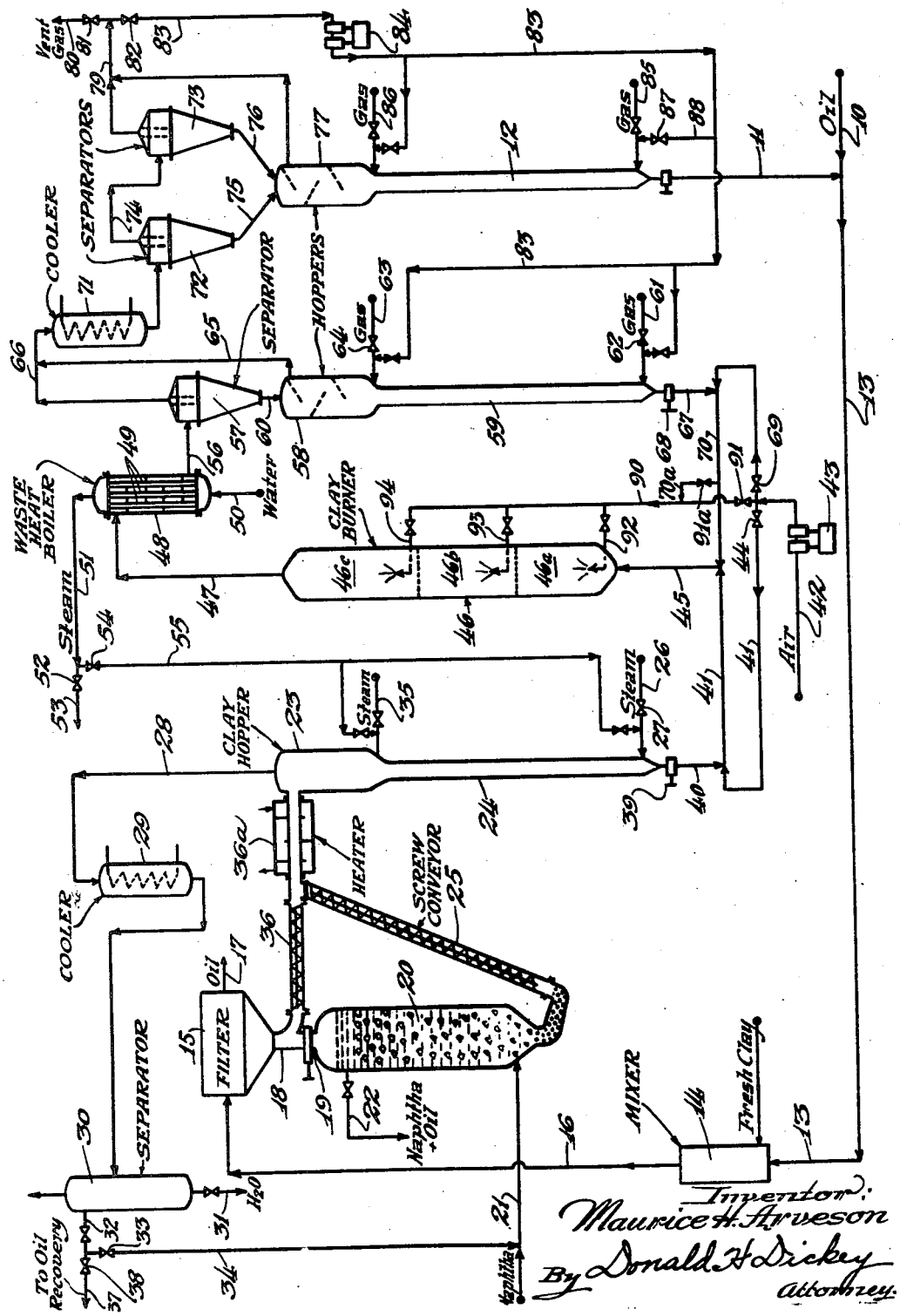
Inventor:
Maurice H. Arveson
By Donald H. Dickey
Attorney.

Patented Oct. 15, 1946

2,409,234

UNITED STATES PATENT OFFICE 2,409,234

REVIVIFYING ADSORPTIVE MATERIAL

Maurice H. Arveson, Flossmoor, Ill., assignor to Standard Oil Company, Chicago, Ill., a corporation of Indiana Application December 31, 1940, Serial No. 372,515

3 Claims. (Cl. 252—281)

This invention relates to the decolorization of oils with solid sorbent materials and is directed more particularly to a method and apparatus for the decolorization of oils with clays, bauxite, etc., and to the reactivation by burning of the clays, bauxite, etc.

The use of solid sorbent materials to improve the color of animal, mineral and vegetable oils is well known. The process is ordinarily carried out in one of two ways. In one method the oil and finely divided solid sorbent material are mixed together, and thereafter the oil is recovered from the sorbent by various means such as a filter, which retains the solid material contaminated with the coloring matter and permits the improved oil to escape. This is the so-called "contact method." In the other method, the oil is allowed to pass down over a body of sorbent material contained in a vessel, the decolorized oil being recovered therefrom, in a "percolation" manner. The oil is not usually completely decolorized, i. e. not all of the color bodies are removed, but sufficient color is removed so that the product is of lighter color than the original.

A rather finely divided solid is ordinarily employed for the contact process, having a grain size of about 200 to 400 mesh; i. e. at least the greater part of the solid will pass through a screen having 200 meshes per square inch and the majority will be retained on a screen having 400 meshes per square inch, while the percolation method employs solids of about 30 to 60 mesh.

As solid sorbent materials I can use clays, such as fuller's earth, bauxite, silica gels, bentonite, montmorillonites, charcoal, particularly activated charcoal, or any other porous adsorptive contact material. The coloring matter together with some of the oil adheres to the surface or enters the pores of the sorbent solid, and thereby soon masks its effectiveness. A portion of the coloring matter, etc. can be removed by the use of solvents, or washes, such as naphtha, low boiling alcohols and ketones, as well as other oxygenated or halogenated organic compounds. However, in order to condition the clay for reuse, it generally must be burned in order to eliminate the remaining organic material. After a limited number of burnings, however, the clay no longer exhibits sufficient decolorizing action to be effective for reuse. This may be due to the fact that the coloring matter in the pores of the clay was converted to carbon during the burning, but the carbon was sufficiently protected so that it was not oxidized to one of the oxides of carbon, and remained within the pores, filling it and masking its sorptive power. Again, the loss of activity may be due to the presence of local "hot spots" occurring during the burning, in which excessive temperatures are developed, destroying the decolorizing effect of the clay. Various other factors may enter into this, but it has been found commercially that decolorizing clays have a rather limited life, and can be effectively regenerated only a comparatively small number of times.

An object of my invention is to provide a combination process for the decolorization of oils by means of solid sorbent materials and the reactivation of spent sorbent material for reuse as a decolorizing agent.

It is another object of this invention to provide an improved method and apparatus for the regeneration by burning of solid sorbent materials used in the decolorization of oils.

Still another object of my invention is to provide a method and apparatus for the burning of spent decolorizing material under controlled conditions whereby the impairment of the sorbent qualities is avoided.

Other objects and advantages of my invention will become apparent as the description thereof proceeds, read in conjunction with the accompanying drawing which is a flow diagram illustrating one embodiment of my invention.

As has been pointed out, my invention is applicable to the decolorization of animal, vegetable or mineral oils, using solid decolorizing sorbents, but for the sake of simplicity it will be described in connection with the contact treatment of a light viscous oil of petroleum origin.

Referring now to the drawing: A petroleum oil from line 10 is mixed with a regenerated solid sorbent from line 11 and standpipe 12, passed by line 13 to mixer 14 to obtain the required amount of contact, the contacted oil and solid passing from mixer 14 to filter 15 via line 16. Although any solid sorbent suitable for decolorizing oils can be employed, I will describe my process in connection with the use of clay. Filter 15 can be any suitable means for separating the decolorized oil from the clay, as for example, a rotating filter with a scraper arrangement such that the clay-free oil passes out through line 17 while the clay is removed from the rotary filter by a scraper or other means (not shown) and conducted from filter 15 by a screw conveyor or other suitable means.

The clay passes from filter 15 through conduit 18 and can suitably be directed through conduit 19 to wash vessel 20 which is filled with wash naphtha from line 21. The clay settles through the naphtha in wash tank 20, the naphtha removing much of the oil and coloring matter contained on the clay particles and carried therewith by the screw conveyor or other removal means from filter 15. The naphtha plus oil can be removed from the upper portion of wash vessel 20 through line 22 and the oil recovered from the naphtha by separate distillation or stripping means (not shown). The clay is withdrawn from vessel 20 at the base and can be directed to hopper 23 above standpipe 24 by any suitable means such as screw conveyor 25. Although other methods of conveying clay from vessel 20 to hopper 23 can be employed, we have illustrated one method in which hopper 23 is at such a level that conveyor 25 acts as a "seal" for the naphtha, the naphtha level in vessel 20 and conveyor 25 being equalized, and therefore avoiding carrying over great quantities of naphtha which must subsequently be stripped out.

A fluid is introduced into the bottom of standpipe 24 via line 26 and valve 27 to maintain the clay in a dispersed but nevertheless dense aerated condition. A particularly suitable aerating fluid is superheated steam which strips the naphtha from the clay, the steam and naphtha passing overhead from hopper 23 through line 28 and cooler 29, wherein the steam is totally condensed, and directed to separator 30. In separator 30 the condensed steam is withdrawn from the base through line 31 while the recovered naphtha passes overhead through line 32 and can be recycled to wash tower 20 by opening valve 33 in line 34 which joins naphtha feed line 21. Additional steam for stripping naphtha from the clay can be introduced into the lower part of hopper 23 via line 35.

As an alternative method, the clay and oil from filter 15 and line 18 can be sent directly to hopper 23 by a screw conveyor 36, or other suitable means, without the intermediate washing step. In this event it is usually advisable to employ steam as the aerating fluid, although flue gas can be used, the vaporized oil and steam passing overhead from hopper 23 through line 28 and line 32 and discharged through line 37 by opening valve 38 therein to a separate oil recovery system (not shown). A heater 36a can be installed in line 36 prior to hopper 23 to supply indirect heat to the naphtha-wet clay.

The stripped clay from standpipe 24 passes through valve 39 in line 40 at the base of standpipe 24 to line 41 through which air or other gas containing free oxygen is passed. Air can be supplied from line 42 and compressor 43 by opening valve 44 in line 41. The compressed air and clay is then passed via line 45 to clay burner 46 maintained at a suitable burning temperature such as, for instance, from about 950 to 1100° F. In clay burner 46 the air and generated flue gas with the clay pass upward at low velocity, the velocity preferably being sufficiently low so that there will be considerable hold-up of clay in the burning zone. For example, linear velocities of the order of 1 to 2 feet per second are suitable for contact clays of 200 to 400 mesh and higher velocities for coarser clays. Under these conditions there is a decided increase in the concentration of clay per unit volume in the clay burner as compared with the entering concentration of clay, this being due to a "settling" of the clay with respect to the upwardly flowing stream of gas. A preferred operating condition is to maintain such a quantity of clay in the burner 46 that the density of the clay plus vapors will be from about 5 to 30 pounds per cubic foot, preferably about 10 to about 15 pounds per cubic foot. Under these conditions, the solid is in a highly turbulent state, with the result that the temperature in this zone will be uniform, or substantially so, from top to bottom and throughout the entire mass.

If desired, burner 46 can be divided into zones 46a, 46b, 46c, etc., separated by gratings, perforated plates or similar dividers, and air and clay injected at various points. This can be accomplished by directing air from line 42 and clay from line 70 through line 90 and line 70a, respectively, by opening valves 91 and 91a therein, and manifolding the air and clay through valved lines 92, 93 and/or 94 to zones 46a, 46b and 46c, respectively. Due to the turbulence within the zones, there will be no localized cooling effect by the injected air, except possibly at the immediate point of injection where it is quickly dissipated, while the injection of air and clay into the various zones serves not only to maintain the turbulence or "boiling" within burner 46, but also assures that an ample supply of oxygen is present at all points at all times for the oxidation of the carbonaceous deposits on the clay to volatile gases as well as maintaining the temperature in the various zones at the desired level, thus insuring the substantially complete regeneration of the clay.

The solids and flue gas plus any excess air pass from clay burner 46 through line 47 and waste heat boiler 48. As shown, the vapors and solids pass through a bank of tubes 49 in a downward direction but an upflow passage can be utilized. Water enters tubes 49 via line 50 and is converted into steam in this boiler, the steam exiting from waste heat boiler 48 via line 51 and can be used in the refinery or plant for any desired purpose by opening valve 52 in line 53. If the aerating fluid in standpipe 24 is steam, a portion of the steam, preferably superheated steam, from waste heat boiler 48 can be diverted thereto by opening valve 54 in line 55 which joins lines 26 and/or 35 leading to standpipe 24 and hopper 23, respectively.

The cooled stream of solid and flue gas passes from waste heat boiler 48 through line 56 to cyclone separator 57. In cyclone separator 57 sufficient clay is removed from the stream to provide a recycle stream of solids. The separated clay passes to hopper 58 above standpipe 59 via line 60 and is maintained in the standpipe 59 in an aerated condition to prevent bridging. An aerating fluid, which can suitably be compressed flue gas, enters standpipe 59 through line 61 controlled by valve 62 therein. Additional aerating fluid can be injected into hopper 58 via line 63 and valve 64, the fluids from both sources passing from hopper 58 via line 65 which joins line 66 from cyclone separator 57. Clay from standpipe 59 passes through line 67 and valve 68 which can be any suitable metering valve, slide valve, star valve, etc., and is picked up by a stream of air in line 70 and recycled to clay burner 46 through line 45 together with the clay-and-air stream from standpipe 24 and injected into the various zones in clay burner 46 by line 90 as previously described. The combined streams are discharged to clay burner 46 at a rate sufficient to maintain the desired temperature level in the burning zones. The air for recycling the clay from standpipe 59 can be obtained from the same source as that used for directing the clay from standpipe 24 by opening valve 69 in line 70 which leads from line 42.

The balance of the clay and the flue gas from cyclone separator 57 passes via line 66 and further cooling equipment 71 to a series of solid-vapor separators 72 and 73, a portion of the solid materials being separated in cyclone separator 72 while the remainder plus the flue gas passes overhead through line 74 to cyclone separator 73 wherein substantially all of the remaining solids are recovered, solids from both cyclone separator 72 and cyclone separator 73 passing via lines 75 and 76, respectively, to hopper 77 and standpipe 12. Flue gas is vented from cyclone separator 73 via line 79 and line 80 by opening valve 81 therein, or can be recycled by opening valve 82 in line 83 having compressor 84 therein to line 62 and/or 63 in standpipe 59 and hopper 58, respectively, and/or to line 85 and/or line 86 to standpipe 78 and hopper 77 by opening valve 87 in line 88 leading from line 83. The clay is accumulated in hopper 77 and standpipe 12 and stored pending its introduction into oil line 10 as previously described. Fluid from outside sources can also be introduced through line 85 to standpipe 12 or through line 86 to hopper 77 in order to maintain the clay in an aerated condition without bridging.

It is perfectly possible to employ my process for the reactivation of clay or other solid sorbent material in a percolation process rather than a contact process as illustrated. In this event filter 15 will be replaced by a percolation vessel filled with clay of from about 30 to 60 mesh, the clay being directed from standpipe 12 to the percolation unit. As soon as the decolorizing activity of the clay is exhausted, as evidenced by the failure of the clay to remove sufficient coloring bodies from the oil, the stream of oil may be discontinued and the clay removed from the percolator and processed according to either of the previously described methods, i. e. either by naphtha washing with steam stripping of the naphtha from the clay, or by steam stripping of the oil and color bodies prior to burning.

Alternately, after the oil stream has been diverted from the percolation unit, the oil remaining and a part of the coloring matter can be washed from the clay by flooding the unit with naphtha or other suitable solvent, the oil-solvent wash withdrawn, and the clay steamed to remove the remaining solvent prior to withdrawing the clay from the percolation unit for burning. It is usually desirable, particularly with percolation processes, to employ a series of percolation vessels so that while one is being regenerated the percolation can continue in an alternate vessel.

By my process I am able to obtain a more efficient use of solid sorbent material in the decolorization of oils, including a higher yield of oil of a desired color per ton of clay. During regeneration in a low velocity upflow burner of the type described there is more opportunity for the individual clay particles to be freed of their masking deposits than is possible in such apparatus as the previously employed clay-burning furnaces, where the solid material is heated substantially as a mass. The upflow turbulence of my process permits each particle to be contacted with oxygen-bearing gas at elevated temperatures, so that all parts of the particle can be reached while in the ordinary apparatus the particles, resting one upon the other, may act as a shield to prevent the complete burning out of all the coloring matter and hydrocarbon materials contained thereon. Moreover, the development of "hot spots" during burning, wherein the temperature of one part of the catalyst mass escapes control and the temperature rises to such heights that the decolorizing activity of the clay is substantially destroyed, is eliminated in my process. Due to the turbulent effect attained in the low velocity upflow burner, the temperature from top to bottom is substantially uniform, with no opportunity for localized overheating. Also, the recirculation of cooled clay has a temperature controlling effect. Since there is no organic material present to burn in the presence of oxygen, the recirculated clay does not become heated by combustion, and absorbs heat from the surrounding particles from which organic matter is being burned. The recirculated clay is dispersed throughout the clay burner and removes heat substantially equally from all parts within the burner zones. For these reasons none of the decolorizing efficiency of the clay is destroyed or impaired.

Another advantage of my process is that it can be carried out in a "closed system," i. e. the clay or other solid sorbent material need not be exposed to the atmosphere at any time. In the ordinary commercial regeneration of spent clay from the decolorization of oils, the clay is allowed to remain in storage bins until used for decolorization of further quantities of oil. This permits the clay to pick up various amounts of moisture from the atmosphere, and while this does not destroy the ability of the clay to remove color bodies from oils, it does make the clay somewhat less efficient, since all moisture must be replaced by oil in the clay, so that the clay becomes preferentially oil-wettable, rather than water-wettable. In case a considerable amount of moisture was present in the clay, the oil therefrom may at first have a "haze" or cloud, due to the presence of minute amounts of water. In my process, the clay is recycled within a moisture-free system, and returned to the decolorization step, whether contact or percolation, without exposure to the atmosphere. Moreover, by maintaining the clay in the storage bin and accompanying standpipe in an aerated condition, bridging of the solid sorbent is avoided, and crushing or packing of the clay reduced to a minimum.

Another advantage of my process is that it is continuous. The ordinary decolorization process is carried out batchwise, particularly as regards the clay regeneration, there being so far as I know, no provisions in which a solid sorbent material is continuously removed from a decolorization zone, reburned and returned to the decolorization without intermittent storage, either before or after revivification.

Although I have illustrated one embodiment of my invention, it should be understood that this is by way of illustration and not by way of limitation, and that I do not intend to be strictly bound thereby. Also, for the sake of simplicity various details have been omitted, such as pumps, automatic control means, heat exchanges, etc., all of which will be readily supplied by one skilled in the art wishing to practice my invention.

I claim:

1. The process for the revivification of solid contacting material contaminated with adsorbed hydrocarbon matter from the decolorization of oils which comprises dispersing said solid contacting material in a stream of air, introducing said stream of air and solid contacting material into an up-flow burning zone, continuously settling out a portion of the solid contacting material from the stream continuously passing through the burning zone whereby the solid contacting material within the burning zone is maintained in a turbulent mass having a density of between about 5 and about 30 pounds per cubic foot, maintaining uniform temperature throughout said burning zone sufficient to remove substantially all of the adsorbed hydrocarbon matter from said solid contacting material, introducing at vertically spaced points additional quantities of gases into the turbulent mass maintained within the burning zone continuously withdrawing revivified solid contacting material overhead from said burning zone, cooling the withdrawn stream of gases and revivified contacting material, recovering the revivified contacting material from the said gases, and accumulating the recovered solid contacting material in an aerated dense phase.

2. The method of revivifying solid contact material having an average particle size smaller than 200 mesh which material has been deactivated by liquid phase contact with an oil in a decolorization process which method comprises conveying such contact material to the top of a standpipe, introducing an aerating and stripping gas at a low point in said standpipe, passing said contact material downwardly through said standpipe countercurrent to upflowing aeration and stripping gas, dispersing stripped contact material from the base of the standpipe into a stream of an oxidizing gas, introducing said oxidizing gas stream at a low point in a vertical regeneration zone of large horizontal cross-sectional area, passing gases upwardly in the regeneration zone at a velocity in the range of about 1 foot to about 2 feet per second whereby a large amount of said contact material is maintained in said zone as a suspended dense turbulent mass characterized by a substantially uniform temperature from top to bottom and throughout the entire mass, abstracting heat from said regeneration zone at such a rate as to maintain the uniform temperature at a substantially constant regeneration temperature level, separating regenerated contact material from regeneration gases, effecting transfer of the separated contact material by the pressure head developed by an aerated column of said material and introducing a gas into said column for maintaining the solids therein in aerated condition.

3. The method of revivifying solid contact material of small particle size which has become deactivated by liquid phase contact with an oil in a decolorizing process which method comprises introducing such deactivated contact material at the top of a column, introducing a gas into said column for maintaining the solids therein in aerated condition and for effecting a stripping of said solids, dispersing solids from the base of said column into a stream of an oxidizing gas, the pressure head at the base of said column being sufficient to effect the dispersing of said solids in said stream, transferring dispersed solids by said stream to a vertical regeneration zone of large horizontal cross-sectional area and introducing said stream into said zone at a low level therein, passing gases upwardly in the regeneration zone at such vertical velocity as to maintain the contact material as a suspended dense turbulent mass therein characterized by substantially uniform temperature from top to bottom and throughout the entire mass of contact material, abstracting heat from said regeneration zone at such a rate as to maintain a uniform temperature at a substantially constant regeneration temperature level, separating regenerated contact material from regeneration gases, removing the separated material as a downwardly moving aerated solids column, introducing a gas into said column for maintaining the solids therein in aerated condition and dispersing solids from the base of said column in a second fluid stream.

MAURICE H. ARVESON.